(12) United States Patent
Robins

(10) Patent No.: US 9,744,820 B1
(45) Date of Patent: Aug. 29, 2017

(54) VEHICLE RECOVERY HITCH ATTACHMENT DEVICE

(71) Applicant: Terry K. Robins, Minneapolis, KS (US)

(72) Inventor: Terry K. Robins, Minneapolis, KS (US)

(*) Notice: Subject to any disclaimer, the term of this patent is extended or adjusted under 35 U.S.C. 154(b) by 368 days.

(21) Appl. No.: 14/480,786

(22) Filed: Sep. 9, 2014

Related U.S. Application Data

(60) Provisional application No. 61/960,364, filed on Sep. 17, 2013.

(51) Int. Cl.
*B60D 1/02* (2006.01)
*B60D 1/18* (2006.01)

(52) U.S. Cl.
CPC ..................... *B60D 1/02* (2013.01)

(58) Field of Classification Search
CPC F16G 15/04; F16G 15/06; B60D 1/28; B60D 1/18; B60D 1/58; B60D 1/00; B60D 1/065; B60D 1/187; B60D 1/02; B66C 1/20; B66C 1/14
USPC ....... 280/511, 513, 480, 504, 457, 514, 515; 24/583.1, 595.1, 652, 265 AL, 701, 24/580.11
See application file for complete search history.

(56) References Cited

U.S. PATENT DOCUMENTS

| | | | | |
|---|---|---|---|---|
| 1,751,309 A | * | 3/1930 | De Mone ................ | B66C 1/12 24/115 R |
| 2,260,215 A | * | 10/1941 | Donaldson ............ | F16G 17/00 152/233 |
| 2,570,680 A | * | 10/1951 | Huizinga ................ | A01K 1/064 24/116 R |
| 2,732,178 A | * | 1/1956 | Chaney .................... | B66D 3/26 116/200 |
| 2,788,990 A | * | 4/1957 | Barcafer .................. | B60D 1/28 280/457 |
| 2,815,225 A | * | 12/1957 | Barcafer .................. | B60D 1/28 280/457 |
| 3,123,383 A | * | 3/1964 | Humpal ................... | B60D 1/28 24/701 |
| 3,144,748 A | * | 8/1964 | Knop ..................... | B60D 1/187 59/88 |
| 3,282,045 A | * | 11/1966 | Thelan .................... | F16G 15/04 59/93 |

(Continued)

*Primary Examiner* — Anne Marie Boehler
(74) *Attorney, Agent, or Firm* — Rosenberg, Klein & Lee

(57) ABSTRACT

A vehicle recovery hitch attachment device (100, 100', 100") includes a closed link (110) having opposed first and second radiused ends (112, 114) joined by a pair of side members (116), and a pair of eyelet members (122) respectively extending from the pair of side members (116). Each of the pair of eyelet members (122) has an opening (126) formed therethrough aligned one with the other. The first radiused end (112) is fitted over a vehicle hitch tow ball (14) and secured thereat by insertion of a locking pin (130) through the pair of openings (126) in the pair of eyelet members (122) to engage a neck portion (16) of a hitch ball (14) for subsequent coupling of the closed link to recovery equipment (30, 32). A coupling link (140) may be included and coupled to the second radiused end (114) of the closed link (110) for coupling to the recovery equipment (30, 32) or alternately inserted into a hitch receiver tube opening (22) and releasably secured therein by the locking pin (130).

23 Claims, 11 Drawing Sheets

(56) References Cited

U.S. PATENT DOCUMENTS

| | | | | |
|---|---|---|---|---|
| 5,732,967 A | * | 3/1998 | Behling | B60D 1/28 280/457 |
| 2014/0212206 A1 | * | 7/2014 | Moreau | F16G 15/06 403/150 |

* cited by examiner

VEHICLE RECOVERY HITCH ATTACHMENT DEVICE

BACKGROUND OF THE INVENTION

This disclosure directs itself to a vehicle recovery hitch attachment device. More in particular, the disclosure is directed to a vehicle recovery hitch attachment device having a closed link configured to be releasably engageable to the hitch ball of a trailer hitch. Still further, the disclosure is directed to a closed link having opposing first and second radiused ends joined by a pair of side members, and a pair of eyelet members respectively extending from the pair of side members through which a locking pin is releasably received to engage a hitch ball. Further, the vehicle recovery hitch attachment device may include a coupling link having a longitudinally extended oval contour coupled to the closed link. The coupling link has a width dimension sized so that the coupling link is insertable into the bore of a trailer hitch's receiver tube and be releasable secured thereat by a locking pin. Additionally, the vehicle recovery hitch attachment device may further include an accessory link coupled to the coupling link and to which a hook may be coupled to provide alternate methods of connection to recovery equipment.

The recovery of a disabled vehicle from a location where it has "broken down" or otherwise become immobilized has been practiced since that advent of the automobile itself. The devices used to accomplish vehicle recovery will depend on accessibility, the load the vehicle being recovered present (a vehicle stuck in mud presents a greater load than that same vehicle that must be pulled up an embankment or winched onto a flatbed tow truck), the strength of potential anchor points and the like. Recovery equipment includes various bridles, tow hooks, grab hooks, straps, shackles and the like which are available for use with a recovery vehicle. A vehicle that has a trailer hitch coupled to its frame may provide a suitable anchor point for coupling to recovery equipment. Heretofore, grab hooks attached to chains and varieties of ropes, straps and cables have been used that often are not safely attached to a vehicle towing hitch ball or receiver tube. These various grab hook assemblies, depending on the position of the disabled vehicle, are not able to provide a secure attachment to the towing hitch ball or receiver tube of the disabled vehicle and are not able to provide completion of a safe and secure tow.

There is therefore a need in the art for vehicle recovery hitch attachment device that is easily attached to the towing hitch of a disabled vehicle and once attached will maintain a safe and secure attachment, regardless of the angle of pull from the recovery equipment. The vehicle recovery hitch attachment device structures disclosed herein fulfill that need, providing a solution to the problems associated with the use of prior art devices.

SUMMARY OF THE INVENTION

A vehicle recovery hitch attachment device includes a closed link having opposing first and second radiused ends joined by a pair of side members, and a pair of eyelet members respectively extending from the pair of side members. Each of the pair of eyelet members has an opening formed therethrough. The pair of openings are in opposed aligned relationship. The hitch attachment device further includes a longitudinally extended locking pin that is reversibly insertable through the pair of openings in the pair of eyelet members. The closed link adjacent the first radiused end is fitted over a vehicle hitch tow ball and secured thereat by insertion of the locking pin through the pair of openings in the pair of eyelet members to engage a neck portion of a hitch ball for subsequent coupling of the closed link to recovery equipment.

From another aspect, a vehicle recovery hitch attachment device includes a closed link having opposing first and second radiused ends joined by a pair of side members, and a pin holder affixed to the closed link with a pair of aligned openings disposed in correspondence with the pair of side members. Further, the hitch attachment device includes a coupling link connected to the closed link adjacent the second radiused end and has a longitudinally extended oval contour. The coupling link has a width dimension between opposing longitudinally extended sides thereof sized for removable insertion into a receiver tube of a vehicle hitch. Still further, the hitch attachment device includes a longitudinally extended locking pin being reversibly insertable through the pair of aligned openings in the pin holder. The hitch attachment device is coupleable to the vehicle having a hitch by one of (1) the closed link adjacent the first radiused end being fitted over a vehicle hitch tow ball and secured thereat by insertion of the locking pin through the pair of aligned openings in the pin holder to engage a neck portion of a hitch ball for subsequent coupling of the coupling link to recovery equipment or (2) the coupling link being insertable longitudinally into a tubular receiver of a vehicle's hitch and releasably secured thereat by the locking pin being inserted transversely through openings formed in the tubular receiver of the vehicle's hitch for subsequent coupling of the closed link to recovery equipment.

From yet another aspect, a vehicle recovery hitch attachment device includes a closed link having opposing first and second radiused ends of different radii joined by a pair of inclined side members, and a pin holder affixed to the closed link with a pair of aligned openings disposed in correspondence with the pair of inclined side members. The hitch attachment device also includes a coupling link connected to the closed link adjacent the second radiused end and has a longitudinally extended oval contour. The coupling link has a width dimension between opposing longitudinally extended sides thereof sized for removable insertion into a receiver tube of a vehicle hitch. Further, the hitch attachment device includes an accessory link connected to the coupling link. Further yet, the hitch attachment device includes a longitudinally extended locking pin being reversibly insertable through the pair of aligned openings in the pin holder. The hitch attachment device is coupleable to the vehicle having a hitch by one of (1) the closed link adjacent the first radiused end being fitted over a vehicle hitch tow ball and secured thereat by insertion of the locking pin through the pair of aligned openings in the pin holder to engage a neck portion of a hitch ball for subsequent coupling of one of the coupling link or the accessory link to recovery equipment or (2) the coupling link being insertable longitudinally into a tubular receiver of a vehicle's hitch and releasably secured thereat by the locking pin being inserted transversely through openings formed in the tubular receiver of the vehicle's hitch for subsequent coupling of one of the closed link or the accessory link to recovery equipment.

BRIEF DESCRIPTION OF THE DRAWINGS

FIG. 1A is a sectional view of the hitch attachment device taken along the Section Line 1A-1A in FIG. 1;

FIG. 5A is an elevation view of the hitch attachment application of FIG. 5 showing the securement of the locking pin that is passes through openings in the hitch receiver tube;

DETAILED DESCRIPTION OF THE PREFERRED EMBODIMENTS

Figure 1:
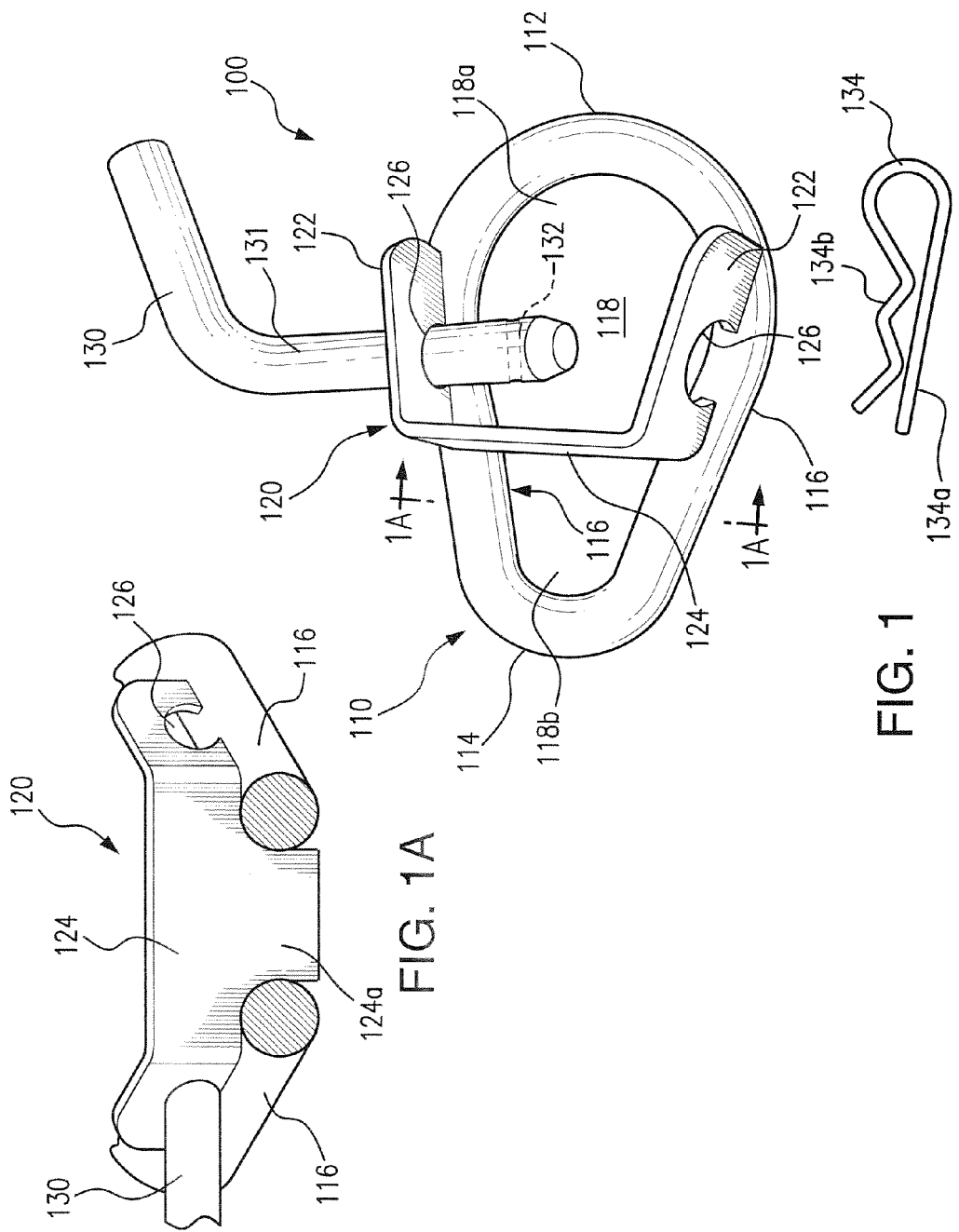
FIG. 1 is an illustration of a hitch attachment device for use in vehicle recovery.

Referring to FIGS. 1-11 there is shown a vehicle recovery hitch attachment device 100, 100', 100", the components thereof and the applications thereof with respect to a vehicle that is to be extricated from a location where it had broken down or otherwise become immobilized. As will become apparent in following paragraphs, hitch attachment device 100 provides for a secure and releasable attachment to a vehicle's towing hitch ball 14. It will become further apparent that hitch attachment device 100', 100" offers multiple uses, providing a secure and releasable attachment to either of a vehicle's towing hitch ball 14 or a vehicle's towing hitch receiver tube 20. As will be seen in following paragraphs, hitch attachment device 100', 100" also provides coupling alternative for connection to recovery equipment, such as a winch cable 36 or a tow chain 32, both with or without a hook 30. Although hitch attachment device 100, 100', 100" is being described as a device for recovery of the vehicle to which the hitch attachment device 100, 100', 100" is connected to one of the towing hitch ball 14 or towing hitch receiver tube 20, it should be understood that hitch attachment device 100', 100" may likewise be connected to the vehicle performing the recovery. Thus, whether used to connect to a vehicle being pulled from a location, or to one doing the pulling, or both, the versatility of hitch attachment device 100, 100', 100" will provide great benefit to the user.

Figure 2:
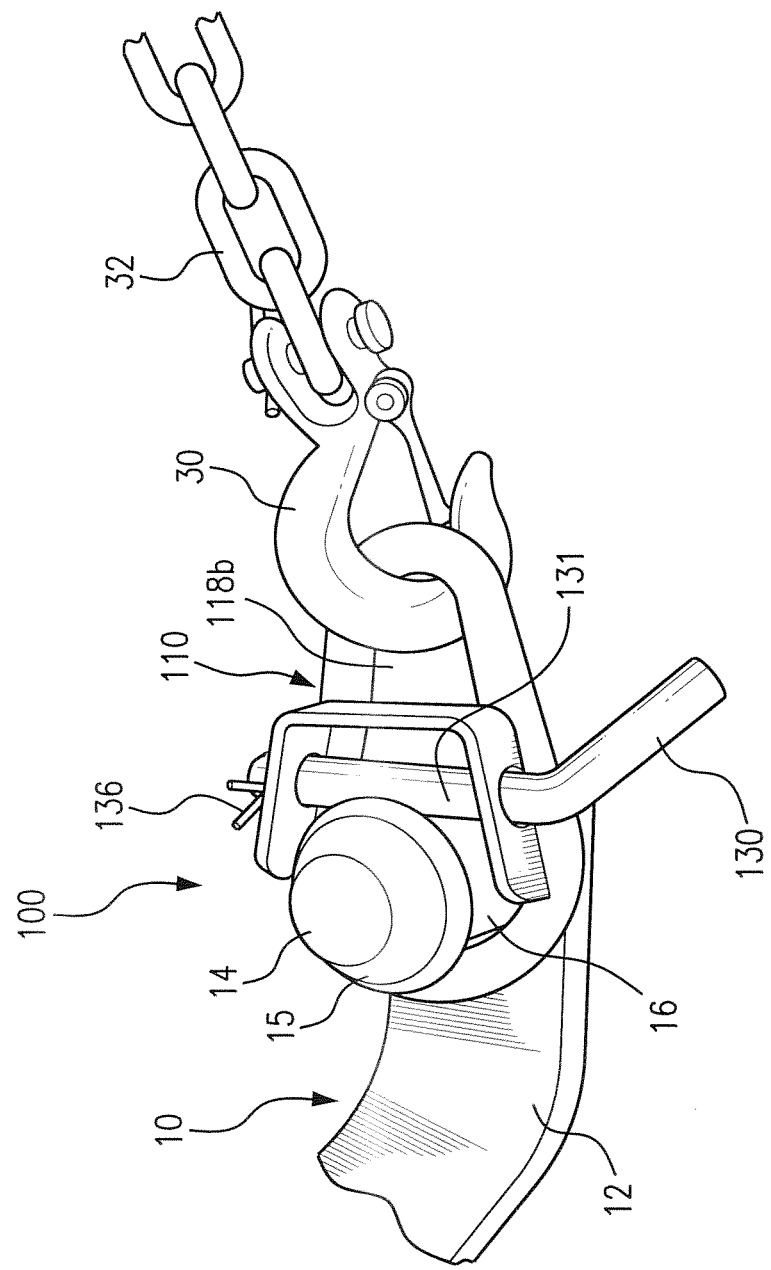
FIG. 2 is an illustration of the application of the hitch attachment device engaging a vehicle's hitch ball.

Referring now to FIGS. 1, 1A and 2, there is shown hitch attachment device 100 for making a secure and releasable coupling to the towing hitch ball 14 of a vehicle to be pulled from its current location. Hitch attachment device 100 includes a closed link 110 having opposed first and second radiused ends 112 and 114 joined by a pair of side members 116. Closed link 110 may be formed by an oval shaped link where the radius of each of the ends 112 and 114 are equal to one another (not shown) and the width of the open area of the link 118 is dimensioned for receive a standard size towing hitch ball 14 therethrough. However, in one working embodiment, as illustrated in FIG. 1, a closed link 110 is formed with the radius of the first end 112 being larger than the radius of the second end 114. Accordingly, the side members 116 extending between the radiused ends 112 and 114 are inclined, diverging from the second radiused end 114. In the towing industry the closed link 110, shown in FIG. 1, is typically referred to as a pear shaped link. Using a pear shaped closed link 110 has been found to provide the advantage that a link of a single size is securable to all three standard sizes (1⅞", 2" and 2 5/16") of vehicle towing hitch balls.

Hitch attachment device 100 further includes a pair of eyelet members 122 affixed to opposing side members 116 and extending transversely therefrom. Each of the eyelet members have an opening in the form of a through hole 126. The two through holes 126 are disposed in aligned relationship for receiving a locking pin 130 therein. It should be understood that each eyelet member 122 may be a separate individual structure, each independently affixed to a corresponding one of the side members 116. However, by interconnecting the pair of eyelet members 122 with a bridge member 124 extending transversely therebetween to form the pin holder 120, a more rigid structure is produced. Additionally by forming the pair of eyelet members 122 and bridge member 124 of pin holder 120 in one-piece integral formation, the alignment of the through holes 126 is more easily manufactured and the efficiency of the manufacturing of the hitch attachment device 100 is improved.

In the working embodiment shown in FIG. 1, the openings formed in each of the eyelet members 122 of pin holder 120 is open at the bottom edge thereof such that a corresponding portion of a respective side member 116 forms a portion of the inner wall defining the through hole 126. This arrangement places the locking pin 130 in close adjacency to upper surface portions of the side members 116 and proper engagement with the neck portion 16 of the hitch ball 14. Further, as shown in FIG. 1A, a portion 124a of the bridge member 124 extends into the open area 118 of the link to divide the open area 118 into a hitch ball engaging portion 118a and a connecting portion 118b. As pin holder 120 is affixed to the closed link 110 by welding or the like metal joining method, the extended portion 124a of bridge member 124 provides a greater surface area for such joining and a greater resistance to torsion loads for both pin holder 120 and closed link 110.

Locking pin 130 is formed of steel and includes a longitudinally extended portion 131 that is passed through the openings 126 in the pair of eyelet members 122. A transversely directed through bore 132 is formed through the longitudinally extended portion 131 of locking pin 130 adjacent the distal end thereof. Subsequent to the longitudinally extended portion 131 of locking pin 130 being passed through the openings 126 in the pair of eyelet members 122, the locking pin 130 is releasably secured thereat by passing one leg 134a of a hitch pin clip 134 through the through bore 132 so that the second leg 132b of the hitch pin clip engages an outer surface portion of the longitudinally extended portion 131 of locking pin 130. Hitch pin clip 134 is well known in the art, as is its method of releasable engagement with locking pin 130. Hinge pin clip 134 is also known as a hairpin clip, a spring clip or a spring safety clip. In place of hinge pin clip 134, a conventional cotter pin 136 may be used as well, as shown in FIGS. 2 and 5A. As an alternative to use of the through bore 132, an annular groove (not shown) may be formed in the longitudinally extended portion 131 of locking pin 130 adjacent the distal end for engagement with a hinge pin clip 134. Locking pin 130 may also be releasably retained in engagement with the pin holder 120 by use of one or more spring biased detent balls adjacent the distal end of the longitudinally extended portion 131. Such detent pins are also well known in the art and readily available from numerous suppliers.

In use, the closed link 110 is placed over the hitch ball 14 that is connected to the ball mount 12 of a vehicle's trailer hitch 10, such that the hitch ball 14 passes into the hitch ball engaging portion 118a of the open area 118 of closed link 110. The neck portion 16 of the hitch ball 14 is then captured between the first radiused end 112 of closed link 110 and the longitudinally extended portion 131 of locking pin 130 after the locking pin 130 has been engaged with the pin holder 120. Since the neck portion 16 is of a smaller diameter than the head portion 15, the hitch attachment device 100 is thus retained thereat. For safety, the locking pin 130 is releasably retained in position by the insertion of a cotter pin 136, or alternately the hitch pin clip 134, as previously described. Once the hitch attachment device 100 has been installed on the hitch ball 14, as just described, recovery equipment via a hook 30 coupled to a tow chain 32 is passed into the connecting portion 118b of the open space 118 of closed link 110 to engage the second radiused end 114 of closed link 110. By this arrangement, the hitch attachment device 100 will not inadvertently detach from the vehicle's hitch ball 14, regardless of the angle of pull. Where the trailer hitch 10 is connected to the vehicle doing the "pulling," the opposing end of the tow chain 32 would be coupled to the vehicle being extricated.

Figure 3:
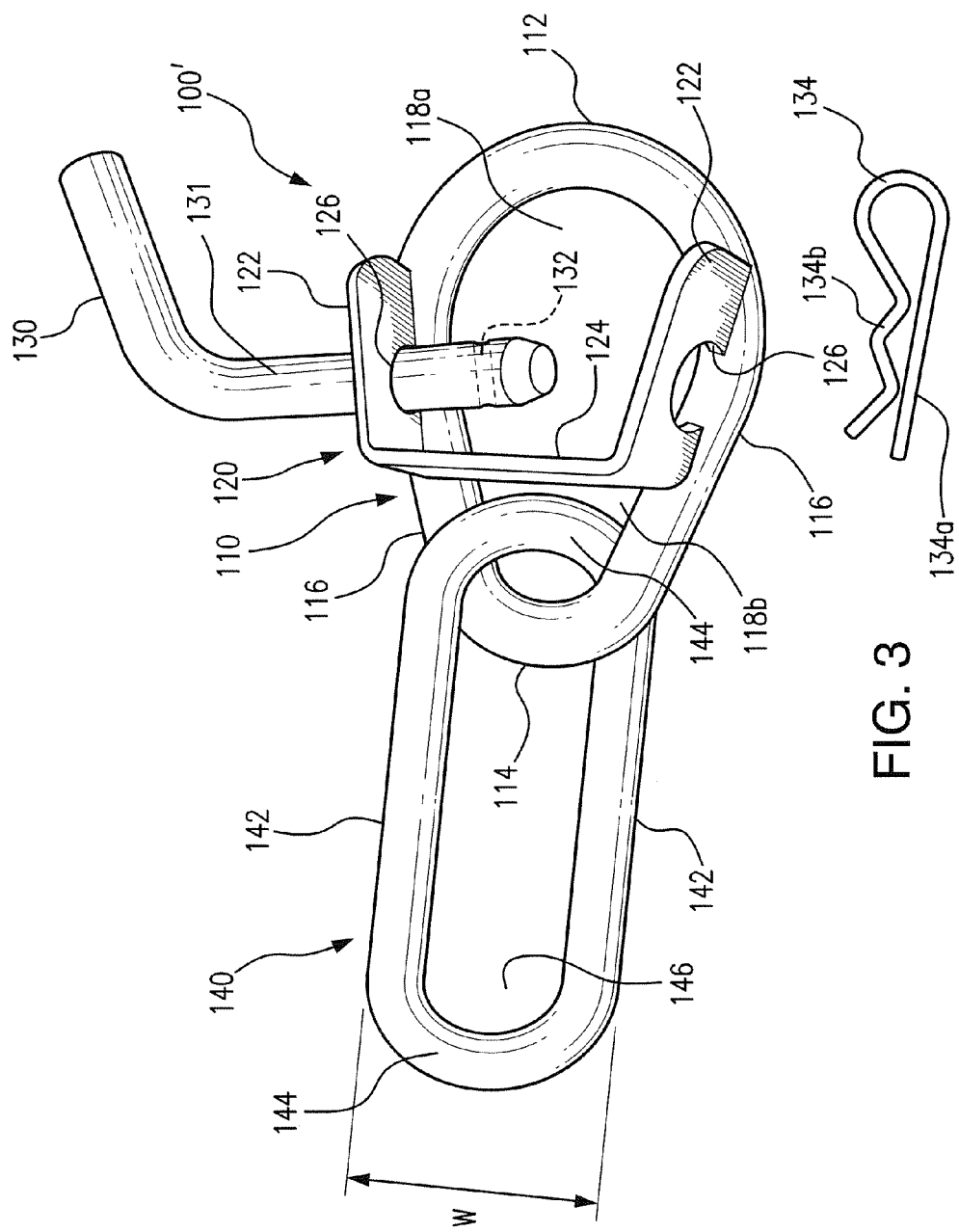
FIG. 3 is an illustration of a hitch attachment device including a coupling link.
Figure 4:
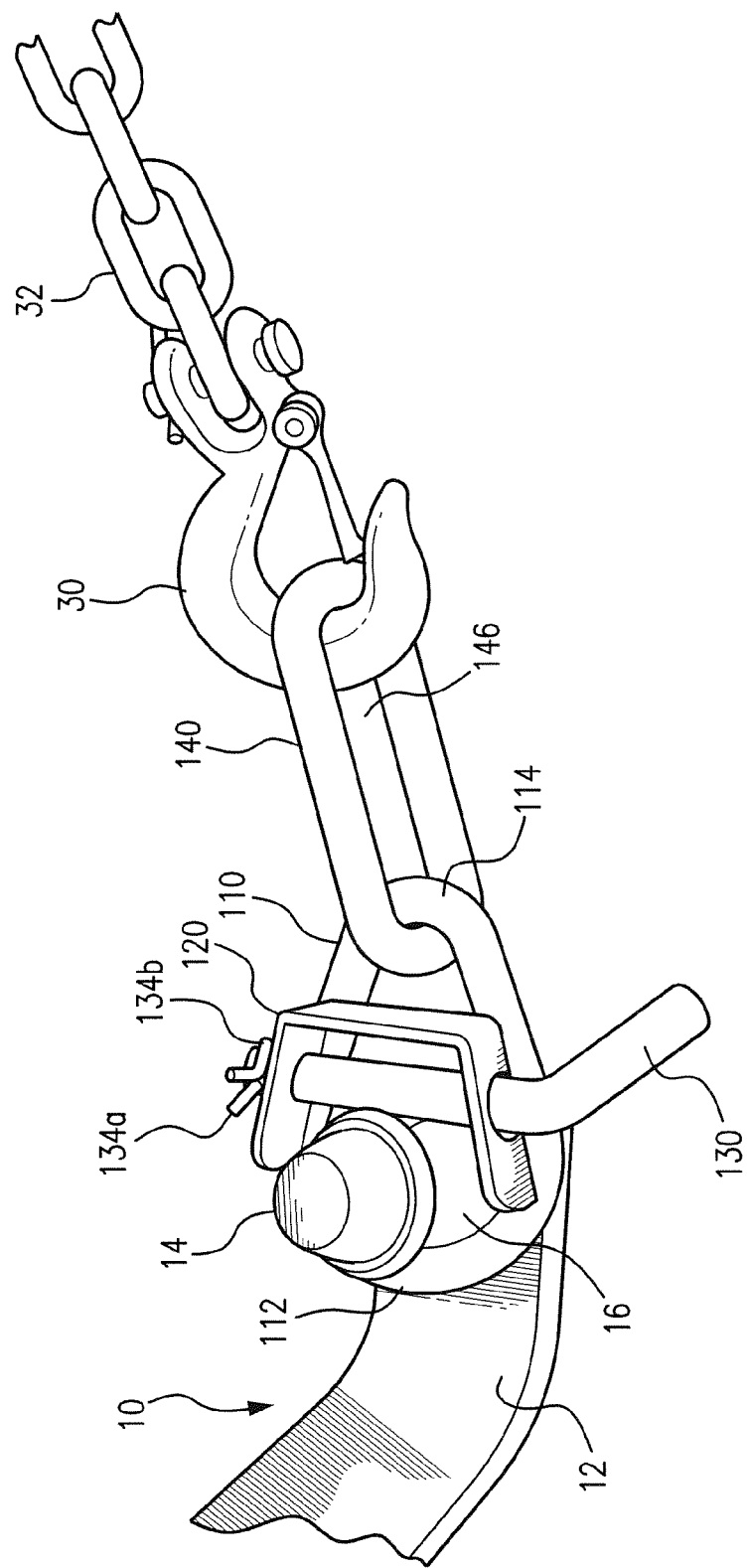
FIG. 4 is an illustration of the application of the hitch attachment device of FIG. 3 engaging a vehicle's hitch ball.

Turning now to FIGS. 3 and 4, there is shown hitch attachment device 100' which includes all of the elements of the aforesaid hitch attachment device 100 with the addition of a coupling link 140. Coupling link 140 is a closed link having opposing radiused ends 144 joined by longitudinally extended sides 142, such that coupling link 140 has a longitudinally extended oval contour. Coupling link 140 is engaged with the closed link 110, being linked to the second radiused end 114 through the connecting portion 118b of the open area 118. In use, where the closed link 110 is engaged with the hitch ball 14 of a vehicle's trailer hitch 10, the longitudinally extended coupling link 140 will advantageously provide for convenient coupling with the hook 30 of the recovery equipment. The large open area 146 of the coupling link 140 will accommodate a large diversity of different size and/or type of hooks that may be employed with various winch or tow cables, tow chains or the like.

Figure 5:
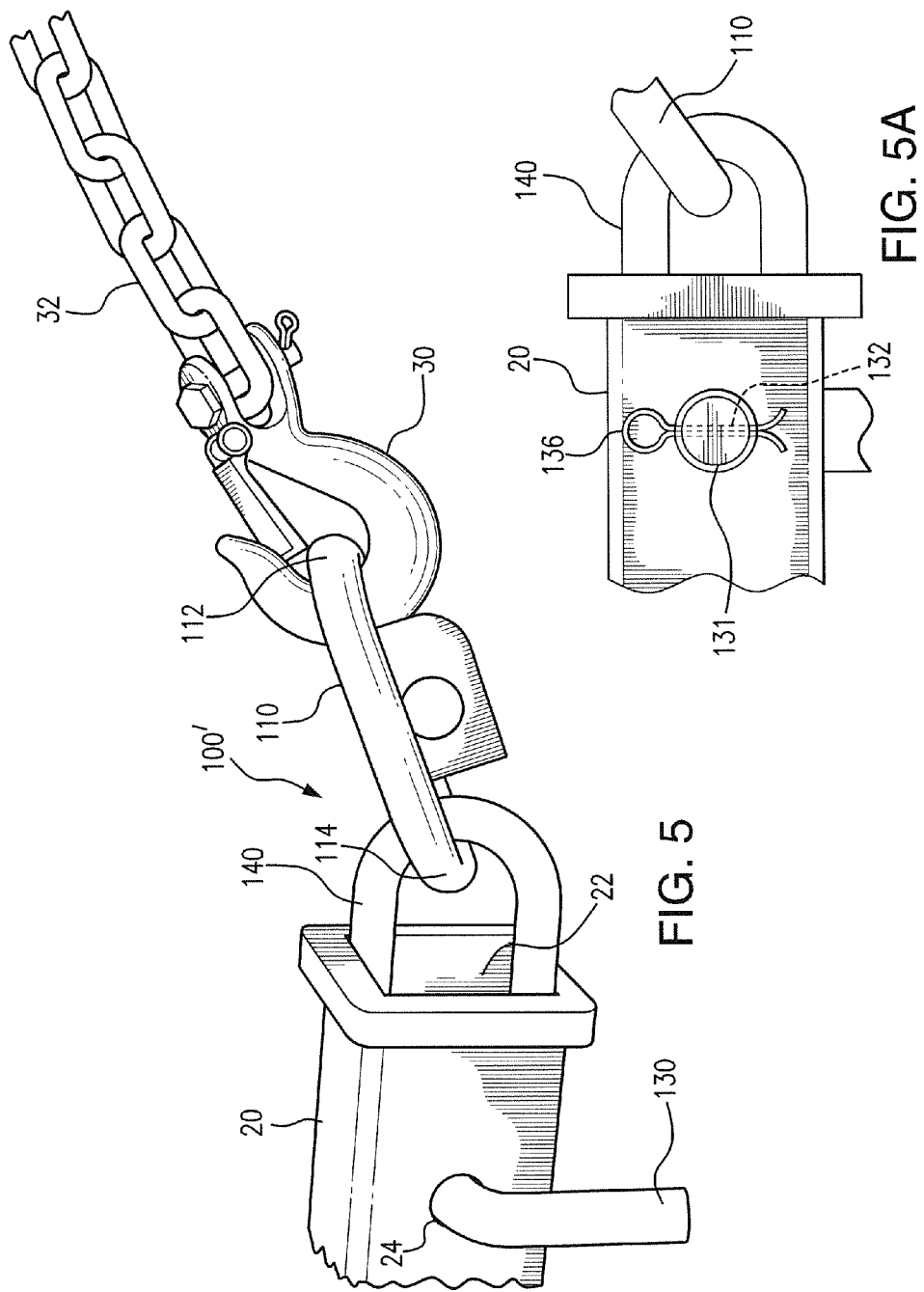
FIG. 5 is an illustration of another application of the hitch attachment device of FIG. 3 engaging a vehicle's hitch receiver tube.
Figure 6:
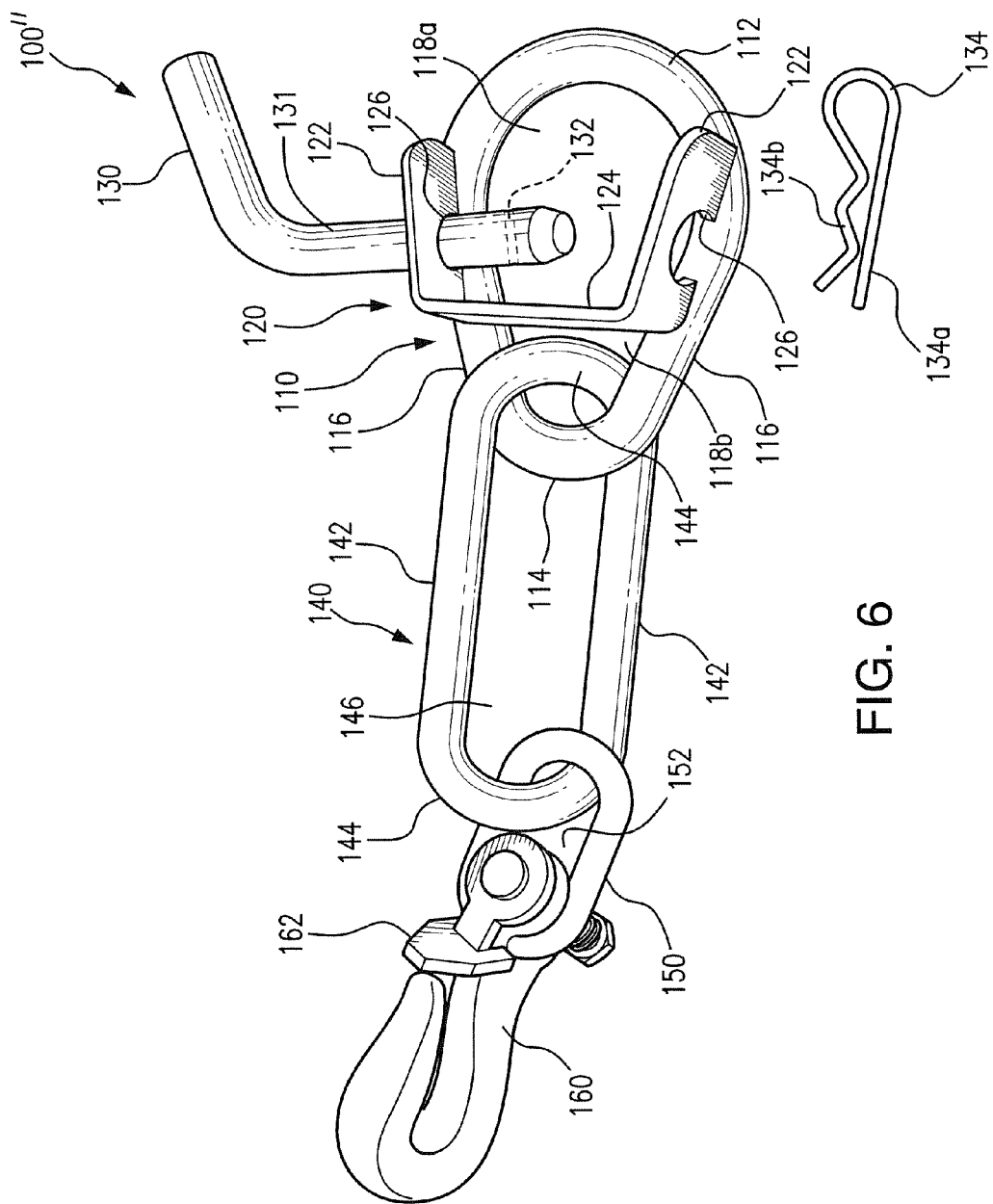
FIG. 6 is an illustration of a hitch attachment device including a coupling link, an accessory link and an optional hook.

Of greater importance for hitch attachment device 100' is the multiuse capability that the addition of coupling link 140 provides. In past vehicle trailer hitches 10 utilized a ball mount 12 that was formed of a flat metal stock welded to supporting members. Referring further to FIGS. 5 and 5A, modern vehicle trailer hitches 10 incorporate a hitch receiver tube 20 that in turn may receive various mounts for hitch balls such as the mount 12, as well as shackles, hooks, etc. Such mounts are releasably secured within the square shaped bore 22 of the receiver tube 20 by a locking pin, like that of locking pin 130. The receiver tube 20 is therefore provided with a pair of pin receiver openings 24 transverse to the receiver bore 22, that in normal use align with corresponding openings in the portion of the mount 12 inserted into the bore 22 of the receiver tube 20, through which the locking pin extends.

Coupling link 140 has a width dimension W between the longitudinally sides 142 that is sized to fit within the bore 22 of the receiver tube 20. As with hitch balls, hitch receiver tubes are available in multiple sizes. For a smaller size receiver tube, the coupling link 140 may be installed diagonally, corner-to-corner, within the bore 22, while passing more easily into the bore 22 of the larger sizes of receiver tubes 20. Thus, where the hitch ball mount 12 is not present in the vehicle to be extricated or it is unsafe to extricate the vehicle by coupling to the hitch ball 14, the coupling link 140 provides the added versatility and capability to connect directly to the receiver tube 20. Subsequent to insertion of coupling link 140 into the hitch receiver's bore 22, the locking pin 130 is inserted through the openings 24 formed through opposing walls of the receiver tube 20, and thereby passing through the open area 146 of coupling link 140. In that manner, responsive to a pulling force applied to the hitch attachment device 100', the corresponding radiused end 144 of the coupling link 140 will be blocked by the locking pin 130 and transfer the tensile force from the coupling link 140, through the locking pin 130 to the receiver tube 20, from which the force will be distributed to the vehicle's frame. For safety, the locking pin 130 is releasably retained in engagement with the receiver tube 20 by means of a pin or clip passed through the transverse through hole 132 in the longitudinally extended portion 131 of locking pin 130. In the particular example illustrated in FIG. 5A, a cotter pin 136 is used to releasably retain, as an alternative to the hitch pin clip 134 previously discussed.

The recovery equipment may be connected directly to the radiused end 144 of the coupling link 140, depending on the size of the hook, allowing the closed link 110 to simply hank freely therefrom. However, the hook 30 of the tow chain 32 will more conveniently connect to the closed loop 110. The hook 30 can be engaged with the first radiused end 112 through the hitch ball engaging portion 118a of the open area 118. Hence, the hitch attachment device 100' provides for versatile attachment to a towing hitch, through either the hitch ball 14 or the hitch receiver tube 20.

Referring now to FIGS. 6-11, there is shown hitch attachment device 100" which includes all of the elements of the aforesaid hitch attachment device 100', and thereby all of the elements of hitch attachment device 100, with the addition of an accessory link 150 to which any of a plurality of different types of hooks 160 may be coupled. Although a hook, such as the depicted grab hook 160, may be connected directly to the coupling hook 140, use of the accessory link 150 ensures that the hook 160 can hang free unobtrusively where the recovery equipment includes a hook 30 that directly engages the closed link 110. Providing the hitch attachment device 100" to the user as a combination of the closed loop 110 with the pin holder 120 and latching pin 130 and associated hitch pin clip 134, the coupling link 140 and accessory link 150, allows the user to choose the type of hook 160 they wish to employ.

Accessory link 150 is an oval shaped link having an open area 152 that is linked to the coupling link 140 through the open area 146 thereof. The hook 160 may be any of a wide variety of types of hook and connected to the accessory link through various types of attachment, without departing from the inventive concepts disclosed herein. In one working embodiment, a grab type hook with a clevis type link attachment has been successfully used and provided sufficient versatility in providing coupling to recovery equipment. The hook 160 may include an optional spring biased safety latch 162 to prevent unintentional disengagement of the hook 160 from the recovery equipment.

Figure 7:
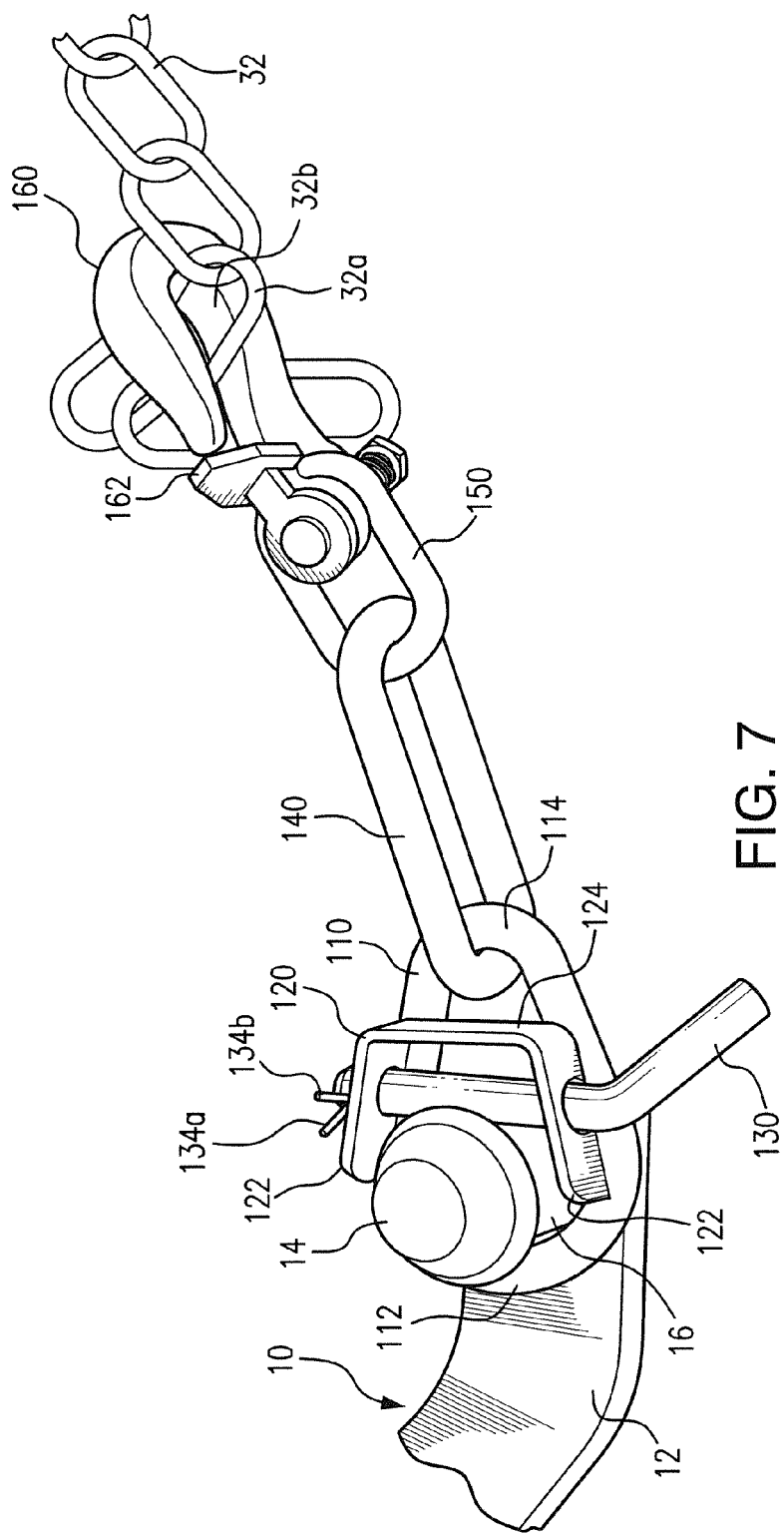
FIG. 7 is an illustration of the application of the hitch attachment device of FIG. 6 engaging a vehicle's hitch ball.
Figure 8:
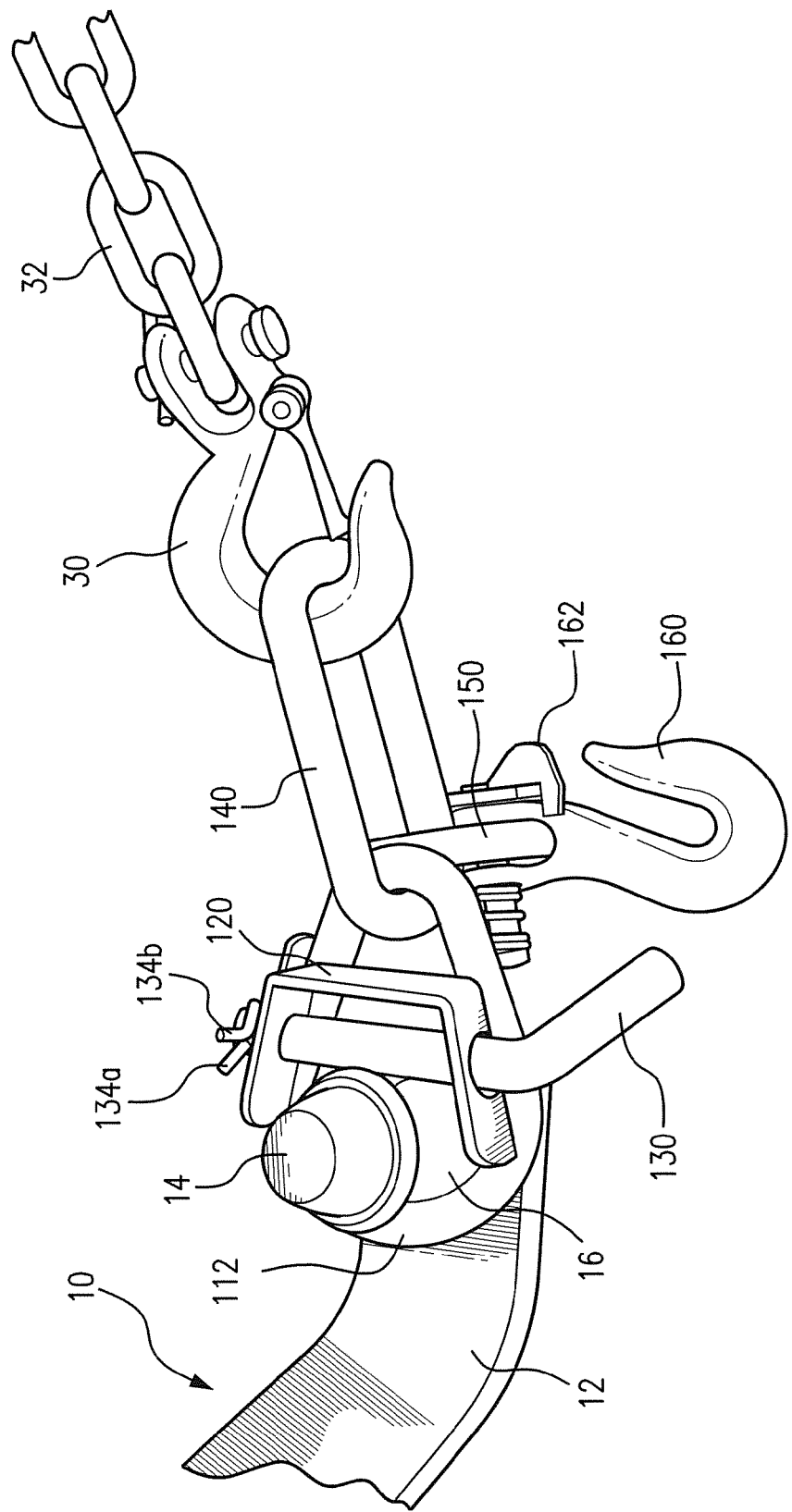
FIG. 8 is an illustration of an alternate application of the hitch attachment device of FIG. 6 engaging a vehicle's hitch ball.
Figure 9:
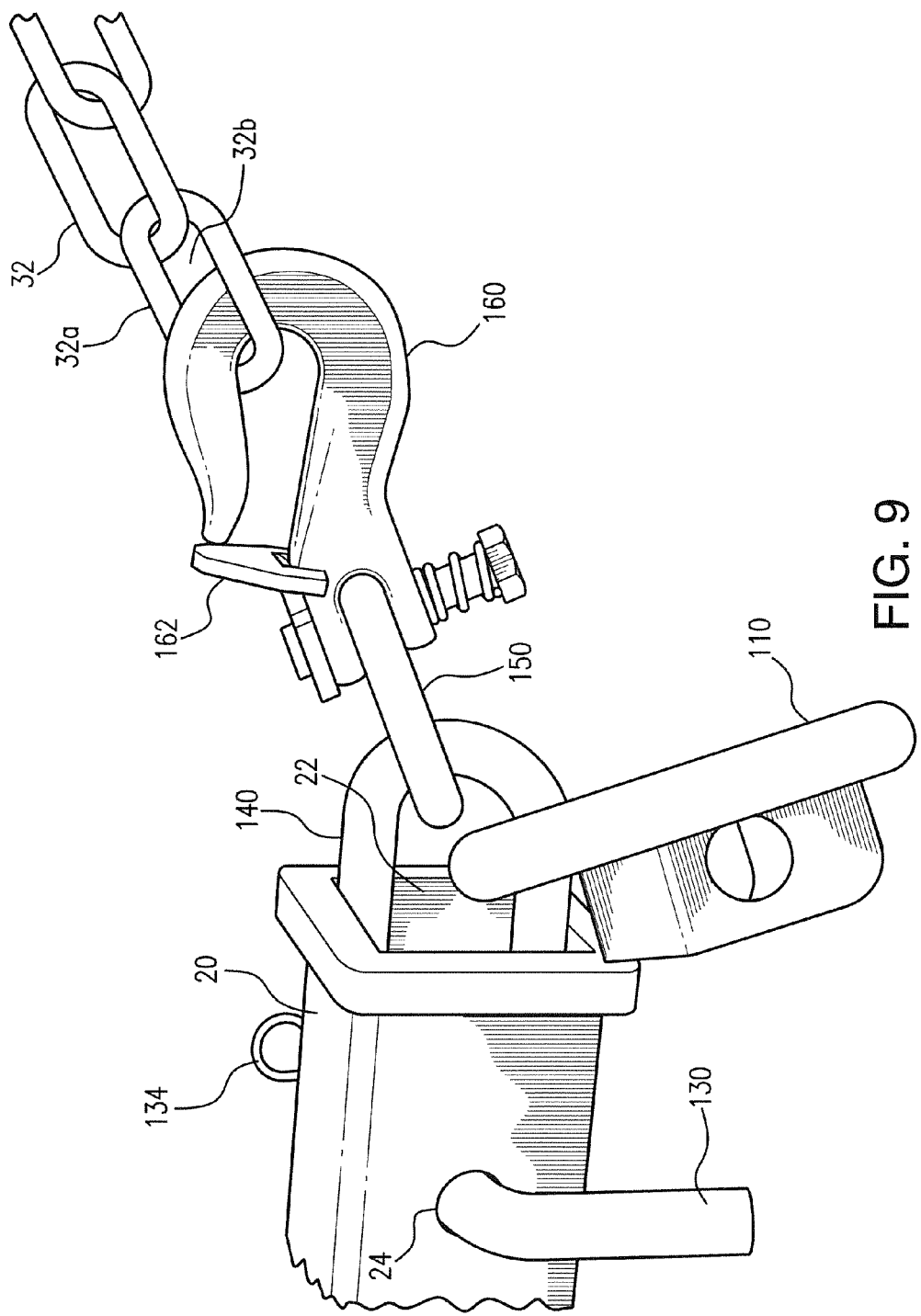
FIG. 9 is an illustration of application of the hitch attachment device of FIG. 6 engaging a vehicle's hitch receiver tube with use of the optional hook.

In use, as shown in FIG. 7, the closed link 110 of hitch attachment device 100" is engaged to the hitch ball 14 of the trailer hitch 10 in the same manner as previously described with respect to hitch attachment device 100. The coupling link 140 provides coupling between the closed link 110 and the hook 160 through the accessory link 150. Use of a grab type hook as the hook 160 permits the link 32a of the tow chain to be engaged by the hook without the hook having to pass into the open area 32b of the link 32a. The links adjacent to the link 32a being angularly offset with respect to link 32a prevents the chain 32 from sliding through the hook opening, as is known in the art.

Where the tow chain 32 of the recovery equipment includes a hook 30, such may be directly connected to the coupling link 140, as previously described for hitch attachment device 100'. As shown in FIG. 8, the accessory link 150 and attached hook 160 hangs freely and unobtrusively from the coupling link 140 when the hook 30 is engaged with the coupling link 140, during extrication of the vehicle to which the trailer hitch 10 is attached. As previously mentioned, the vehicle to which the trailer hitch 10 is attached may alternately be performing the recovery operation.

Figure 10:
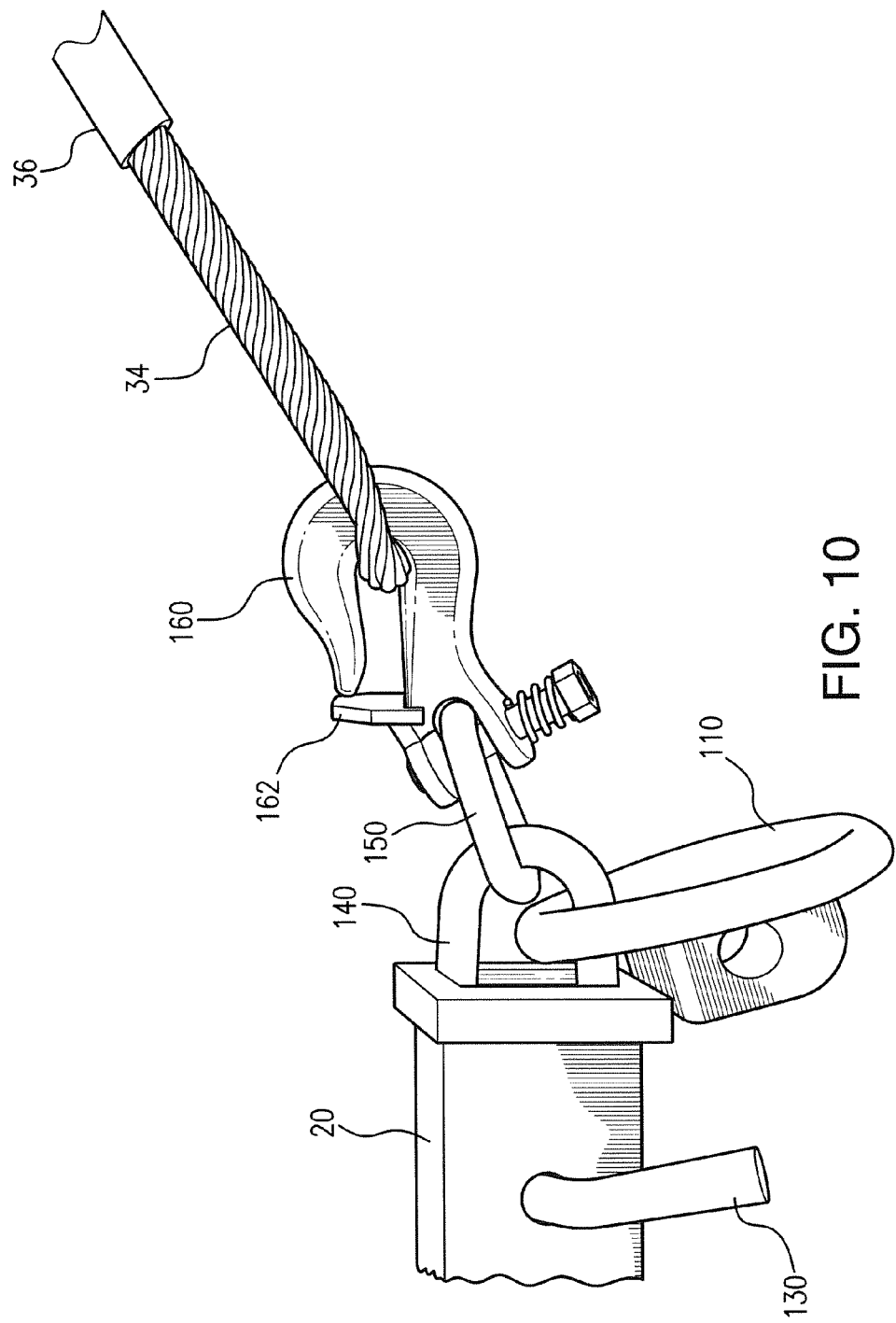
FIG. 10 is an illustration of another application of the hitch attachment device of FIG. 6 engaging a vehicle's hitch receiver tube with use of the optional hook to engage the loop of a of winch or tow cable.
Figure 11:
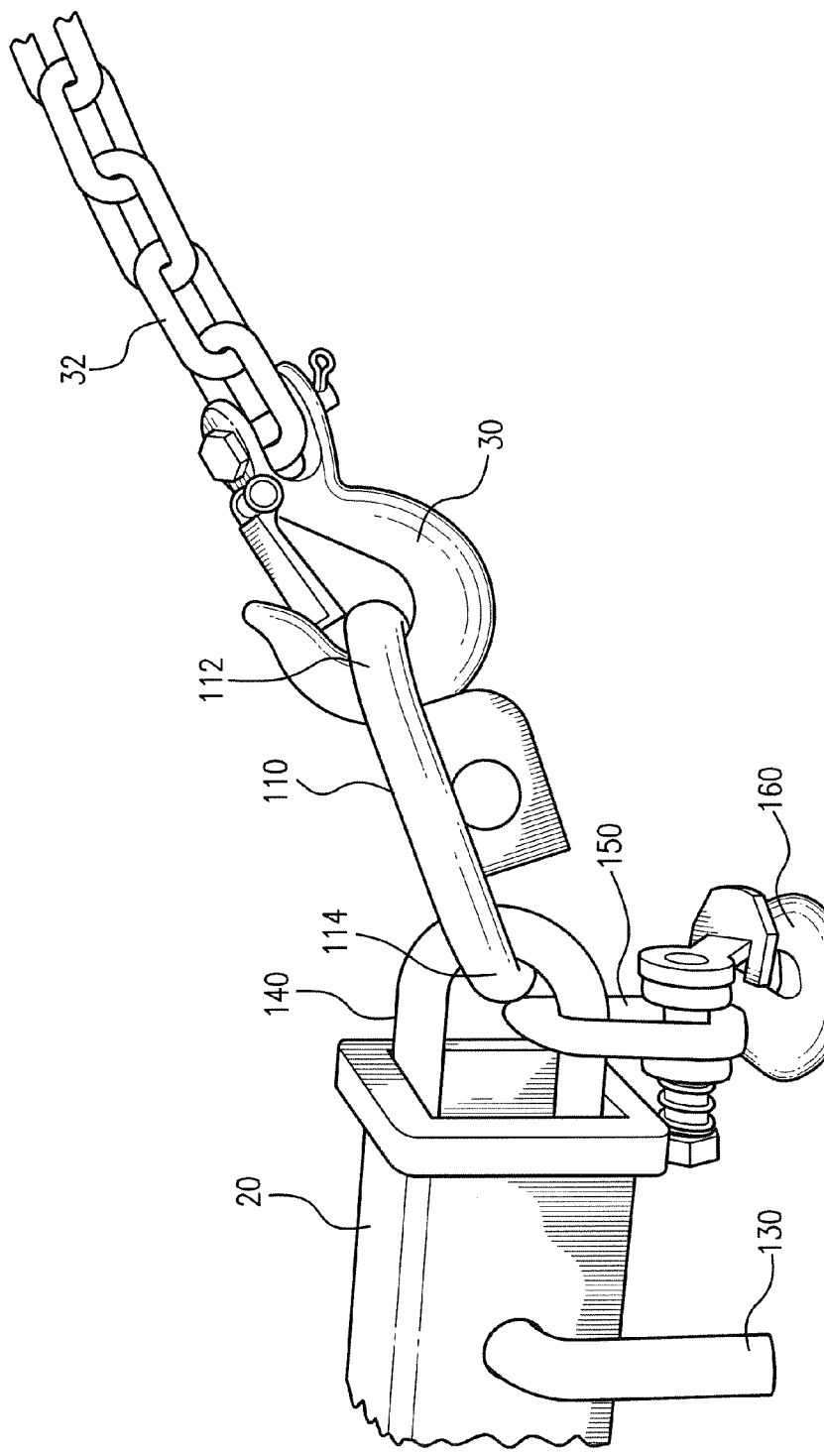
FIG. 11 is an illustration of yet another application of the hitch attachment device of FIG. 6 engaging a vehicle's hitch receiver tube.

When the coupling link 140 is used to engage the hitch's receiver tube 20, as shown in FIGS. 10 and 11, the hook 160 coupled to the coupling link 140 through the accessory link 150 is usable to engage the recovery equipment. In addition to direct coupling to the tow chain, as illustrated in FIG. 7, the hook 160 may be engaged with a loop portion 34 of winch or towing cable 36. In this application, the closed link 110 simply hangs freely and unobtrusively from the coupling link 140 during extrication of the vehicle to which the hitch's receiver tube 20 is attached. In an application where the recovery equipment includes a hook 30, as illustrated in FIG. 11, the hook 30 is engaged to the first radiused end 112 of the closed link 110, as was previously described with respect to FIG. 5. For this application, the accessory link 150 with the hook 160 attached thereto link 110 hangs freely and unobtrusively from the coupling link 140 during extrication of the vehicle to which the hitch's receiver tube 20 is attached. As a result of the unique combination of elements that form the disclosed hitch attachment device, multiple methods of coupling to a vehicle's trailer hitch are employable and a plurality of recovery equipment coupling arrangements are made possible to provide a versatile and multiuse hitch attachment device.

The descriptions above are intended to illustrate possible implementations of the present invention and are not restrictive. While this invention has been described in connection with specific forms and embodiments thereof, it will be appreciated that various modifications other than those discussed above may be resorted to without departing from the spirit or scope of the invention. Such variations, modifications, and alternatives will become apparent to the skilled artisan upon review of the disclosure. For example, functionally equivalent elements may be substituted for those specifically shown and described, and certain features may be used independently of other features, and in certain cases, particular locations of elements may be reversed or interposed, all without departing from the spirit or scope of the invention as defined in the appended Claims. The scope of the invention should therefore be determined with reference to the description above, the appended claims and drawings, along with their full range of equivalents.

What is being claimed is:

1. A vehicle recovery hitch attachment device, comprising:
    a closed link having opposing first and second radiused ends joined by a pair of side members;
    a pair of eyelet members respectively extending from said pair of side members, said pair of eyelet members having a pair of openings formed therethrough in opposed aligned relationship;
    a bridge member extending transversely between said pair of eyelet members; and
    a longitudinally extended locking pin being reversibly insertable through said pair of openings in said pair of eyelet members, wherein said closed link adjacent said first radiused end is fitted over a vehicle hitch tow ball and secured thereat by insertion of said locking pin through said pair of openings in said pair of eyelet members to engage a neck portion of a hitch ball for subsequent coupling of said closed link to recovery equipment.

2. The vehicle recovery hitch attachment device as recited in claim 1, where said bridge member is integrally formed in one piece with said pair of eyelet members to form a rigid structure therewith.

3. The vehicle recovery hitch attachment device as recited in claim 1, where said bridge member divides an open area of said closed link bounded by an inner wall thereof into a hitch ball engaging portion and a connecting portion for coupling to the recovery equipment.

4. The vehicle recovery hitch attachment device as recited in claim 1, where said locking pin is configured for releasable locking engagement with at least one of said eyelet members.

5. The vehicle recovery hitch attachment device as recited in claim 4, further comprising a pin fastener removably insertable through a transversely directed through hole formed in said locking pin.

6. The vehicle recovery hitch attachment device as recited in claim 1, further comprising a coupling link connected to said closed link adjacent said second radiused end and having a longitudinally extended oval contour.

7. The vehicle recovery hitch attachment device as recited in claim 6, where said coupling link has a width dimension between opposing longitudinally extended sides thereof sized for removable insertion into a vehicle hitch receiver tube.

8. The vehicle recovery hitch attachment device as recited in claim 6, further comprising a hook coupled to said coupling link.

9. The vehicle recovery hitch attachment device as recited in claim 8, where said hook is coupled to said coupling link by an accessory link connected between said hook and said coupling link.

10. The vehicle recovery hitch attachment device as recited in claim 6, further comprising an accessory link connected to said coupling link.

11. The vehicle recovery hitch attachment device as recited in claim 1, where said first and second radiused ends of said closed link are of different radii.

12. The vehicle recovery hitch attachment device as recited in claim 1, where said first radiused end of said closed link has a larger radius than said second radiused end.

13. A vehicle recovery hitch attachment device, comprising:
    a closed link having opposing first and second radiused ends joined by a pair of side members circumscribing an open area of said closed link;
    a pin holder affixed to said closed link and having a pair of aligned openings disposed in correspondence with said pair of side members, said pin holder including a pair of eyelet members respectively extending from said pair of side members, each of said pair of aligned openings being formed in a respective one of said pair of eyelet members, and a bridge member extending transversely between said pair of eyelet members;

a coupling link coupled to said closed link and disposed adjacent said second radiused end of said closed link and having a longitudinally extended oval contour, said coupling link having a width dimension between opposing longitudinally extended sides thereof sized for removable insertion into a receiver tube of a vehicle hitch; and a longitudinally extended locking pin being selectively reversibly insertable through said pair of aligned openings in said pin holder or aligned openings formed through the receiver tube of the vehicle hitch, wherein said hitch attachment device is coupleable to a vehicle hitch tow ball by said closed link adjacent said first radiused end being fitted over the vehicle hitch tow ball and secured thereat by insertion of said locking pin through said pair of aligned openings in said pin holder to engage a neck portion of the hitch tow ball for subsequent coupling of said coupling link to recovery equipment, and in absence of the hitch tow ball, said coupling link being insertable longitudinally into the receiver tube of the vehicle hitch and releasably secured thereat by said locking pin being inserted transversely through the aligned openings formed in the receiver tube of the vehicle hitch for subsequent coupling of said closed link to recovery equipment.

14. The vehicle recovery hitch attachment device as recited in claim 13, where said bridge member is integrally formed in one piece with said pair of eyelet members to form a rigid structure therewith.

15. The vehicle recovery hitch attachment device as recited in claim 14, where said bridge member divides an open area of said closed link bounded by an inner wall thereof into a hitch ball engaging portion and a connecting portion for connection to said coupling link.

16. The vehicle recovery hitch attachment device as recited in claim 13, where said locking pin is configured for releasable locking engagement with said pin holder and the receiver tube of the vehicle hitch.

17. The vehicle recovery hitch attachment device as recited in claim 13, where said closed link has a substantially pear shaped contour in that said first radiused end of said closed link has a larger radius than said second radiused end.

18. The vehicle recovery hitch attachment device as recited in claim 13, where said pin holder includes a portion thereof extending into said open area of said closed link and maintains said coupling link adjacent said second radiused end of said closed link.

19. A vehicle recovery hitch attachment device, comprising:

a closed link having opposing first and second radiused ends of different radii joined by a pair of inclined side members;

a pin holder formed in one-piece formation and affixed to said closed link and having a pair of aligned openings formed through opposing end portions thereof respectively disposed in correspondence with said pair of inclined side members;

a coupling link connected to said closed link adjacent said second radiused end of said closed link and having a longitudinally extended oval contour, said coupling link having a width dimension between opposing longitudinally extended sides thereof sized for removable insertion into a receiver tube of a vehicle hitch;

an accessory link connected to said coupling link; and a longitudinally extended locking pin being selectively reversibly insertable through said pair of aligned openings in said end portions of said pin holder or aligned openings formed through the receiver tube of the vehicle hitch, wherein said hitch attachment device is coupleable to a vehicle hitch tow ball by said closed link adjacent said first radiused end being fitted over the vehicle hitch tow ball and secured thereat by insertion of said locking pin through said pair of aligned openings in said end portions of said pin holder to engage a neck portion of the hitch tow ball for subsequent coupling of one of said coupling link or said accessory link to recovery equipment, and in absence of the hitch tow ball, said coupling link being insertable longitudinally into the receiver tube of the vehicle hitch and releasably secured thereat by said locking pin being inserted transversely through the aligned openings formed in the receiver tube of the vehicle hitch for subsequent coupling of one of said closed link or said accessory link to recovery equipment.

20. The vehicle recovery hitch attachment device as recited in claim 19, where said pin holder includes a bridge portion extending transversely between said opposing end portions, said end portions defining a pair of eyelets.

21. The vehicle recovery hitch attachment device as recited in claim 19, where said pin holder includes a portion thereof extending into an open area of said closed link and maintains said coupling link adjacent said second radiused end of said closed link.

22. A vehicle recovery hitch attachment device, comprising:

a closed link having opposing first and second radiused ends joined by a pair of side members circumscribing an open area of said closed link;

a pin holder affixed to said closed link and having a pair of aligned openings disposed in correspondence with said pair of side members, said pin holder being formed in one-piece formation and having said pair of aligned openings formed through opposing end portions thereof;

a coupling link coupled to said closed link and disposed adjacent said second radiused end of said closed link and having a longitudinally extended oval contour, said coupling link having a width dimension between opposing longitudinally extended sides thereof sized for removable insertion into a receiver tube of a vehicle hitch; and a longitudinally extended locking pin being selectively reversibly insertable through said pair of aligned openings in said pin holder or aligned openings formed through the receiver tube of the vehicle hitch, wherein said hitch attachment device is coupleable to a vehicle hitch tow ball by said closed link adjacent said first radiused end being fitted over the vehicle hitch tow ball and secured thereat by insertion of said locking pin through said pair of aligned openings in said pin holder to engage a neck portion of the hitch tow ball for subsequent coupling of said coupling link to recovery equipment, and in absence of the hitch tow ball, said coupling link being insertable longitudinally into the receiver tube of the vehicle hitch and releasably secured thereat by said locking pin being inserted transversely through the aligned openings formed in the receiver tube of the vehicle hitch for subsequent coupling of said closed link to recovery equipment.

23. The vehicle recovery hitch attachment device as recited in claim 22, where said pin holder includes a portion thereof extending into said open area of said closed link and maintains said coupling link adjacent said second radiused end of said closed link.

* * * * *